United States Patent [19]

Richardson

[11] 4,373,049
[45] Feb. 8, 1983

[54] FLAME-RETARDANT POLYAMIDE COMPOSITIONS

[75] Inventor: Paul N. Richardson, Wilmington, Del.

[73] Assignee: E. I. Du Pont de Nemours and Company, Wilmington, Del.

[21] Appl. No.: 318,349

[22] Filed: Nov. 5, 1981

[51] Int. Cl.³ .............................................. C08K 5/06
[52] U.S. Cl. .................................. 524/375; 524/412; 524/602
[58] Field of Search ................ 524/375, 412, 602, 606

[56] References Cited

U.S. PATENT DOCUMENTS 2,216,835 10/1940 Carothers ............................ 524/375
4,116,702 9/1978 Rohringer .......................... 524/375
4,137,212 1/1979 Theysohn et al. .......... 260/45.75 W
4,167,503 9/1979 Cipriani ............................... 524/375

FOREIGN PATENT DOCUMENTS 1594316 7/1981 United Kingdom .

Primary Examiner—Veronica P. Hoke

[57] ABSTRACT

A flame-retardant polyamide composition is described which is non-brittle. The composition is comprised of a nylon 66 or nylon 66/6, a brominated polystyrene, antimony oxide and a selected non-ionic surfactant.

6 Claims, No Drawings

FLAME-RETARDANT POLYAMIDE COMPOSITIONS

FIELD OF THE INVENTION

This invention relates to flame-retardant polyamide compositions, and, more particularly, to non-brittle flame-retardant polyamide compositions.

BACKGROUND OF THE INVENTION

A flame-retardant polyamide molding composition composed of a polyamide (nylon 66 or 66/6), brominated polystyrene and antimony trioxide has good thermal stability and reduced flammability, but it is brittle, i.e., has poor elongation properties. It is desirable to improve the elongation of such compositions and thereby render the compositions less brittle.

SUMMARY OF THE INVENTION

It has now been found that the elongation of such compositions can be improved by adding a non-ionic surfactant having the formula selected from

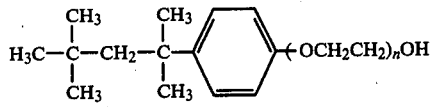  I wherein n is a cardinal number of from 10-40, or

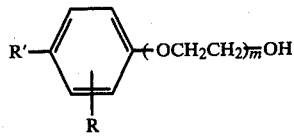  II wherein m is a cardinal number of from 8-15, R' is alkyl of 9-12 carbon atoms, and R is $C_9H_{19}-$ or H—.

Specifically, the composition of this invention is a flame-retardant, composition consisting essentially of (a) about 37-80 weight percent of composition of a polyamide of film-forming molecular weight selected from nylon 66 or nylon 66/6 copolymer;

(b) about 22-35 weight percent of composition of a brominated polystyrene having an average molecular weight of at least about 30,000 and containing about 55-70% bromine by weight;

(c) about 5-10 weight percent antimony oxide; and (d) about 1-3 weight percent of composition of a non-ionic surfactant of the formula

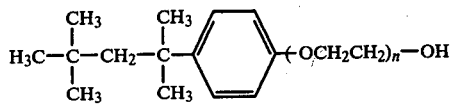

wherein n is a cardinal number of from 10-40, or

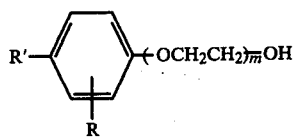

wherein m is a cardinal number of from 8-15, R' is alkyl of 9-12 carbon atoms, and R is $C_9H_{19}-$ or H—.

the percent amounts of components (a) through (d) totaling 100%.

DESCRIPTION OF THE INVENTION

The polyamides useful herein are well known in the art. They are thermoplastic, and are of film-forming molecular weight, i.e., have a number average molecular weight over 5000. The polyamide can be produced by condensation polymerization. Nylon 66 is polyhexamethylene adipamide. Nylon 66/6 is a copolymer made from hexamethylene diamine, adipec acid, and caprolactam. Blends of nylon 66 and nylon 6 are also included. The polyamide is present in an amount of between 37-80 percent, preferably 45-70 percent, based on the weight of components (a)–(d).

The brominated polystyrene should contain 55-70% bromine by weight, preferably about 68% bromine and should have an average molecular weight of at least about 30,000. The polystyrene should be present in an amount of 22-35 percent, preferably 24-30 percent, based on weight of components (a)–(d).

Antimony oxide is present in an amount of 5-10%, preferably 6-8%. It enhances the effectiveness of the flame retardant. It is conveniently added as a concentrate in polyethylene or copolymers such as ethylene/vinyl acetate.

The non-ionic surfactants are preferably the one of formula I above, especially those in which n is 12-13. When the surfactant has the structure of formula II, the surfactant is preferably one in which R' is $C_9H_{19}-$.

The compositions of the inventions are conveniently made by mechanically blending the components. One method of obtaining an intimate blend of the composition in granule form involves the use of a screw extruder to intimately mix in and extrude the mixture and chopping the extrudate into granule form. The ingredients fed to the extruder may consist of a simple tumbled blend of the ingredients or the components may be individually metered to the extruder.

The compositions of the invention may include various other additives such as pigments, dyes, antioxidants, light and heat stabilizers (such as cuprous iodide) and nucleating agents, and mineral-reinforcing agents. Lubricants which improve ease of dispersion of ingredients in the polyamide and release of fabricated articles from the molds may also be included. In addition solid lubricants which reduce wear of fabricated articles in service may also be included. These include graphite, molybdenum disulphide, and aluminum distearate.

The compositions of the invention are normally prepared in a granular form for use in molding processes.

EXAMPLES AND CONTROLS

Materials Used

Polyamides
Nylon 66, $RV^1$ (relative viscosity of 52)
Nylon 66/6 (90/10), $RV^1 = 52$.
Nylon 66+nylon 6 blend

[1] RV was determined on an 8.4% solution in formic acid at 20°-25° C.

Brominated Polystyrene—A polymeric flame retardant containing about 68% aromatic bromine with 3 bromines per aromatic ring.
Molecular weight values are
Mn: 65-85,000
Mw: 150-170,000

It has a density of 2.8 and a softening point of 220° C.

Antimony oxide—80% Sb₂O₃ in polyethylene

Non-ionic surfactants—These are liquid, water soluble nonionic compounds that contain recurring polyoxyethylene units and phenoxy units. Compounds of the formula

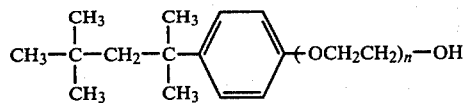   I will be referred to in the Examples as Surfactant "Type I" and by the value of "n".

Compounds of the formula

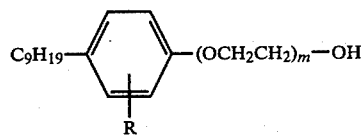   II will be referred to as Surfactant "Type II" and by the value for R and m.

Compounds of the formula

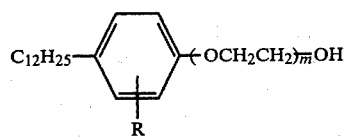   III will be referred to as Surfactant "Type III".

Cuprous iodide was present in an amount of 0.05, wt % as a heat stabilizer; and aluminum distearate was present in an amount of 0.09 wt %, as a lubricant.

Blending

Blends (2 to 5 Kg) were tumbled in polyethylene bags prior to extrusion.

Extrusion Compounding

Tumbled blends were compounded in a 28 mm Werner and Pfleiderer twin screw extruder equipped with screws for good mixing. They were extruded at a rate of 9–10 Kg/hr. Melt temperatures were in the range of 280° C. The extruder was vented during preparation to enhance surface appearance of molded articles.

Molding

Test bars were molded using a screw injection machine and a melt temperature of about 280° C.

Tensile Tests

Tensile tests were carried out on injection molded ⅛ inch (3.2 mm) thick ASTM D638 tensile bars. They were stored in sealed glass jars to keep them dry until tested. They were pulled at a cross-head speed of 2 inches per minute (51 mm per minute).

Flammability Test

Flammability was evaluated by the "Vertical Burning Test for Classifying Materials" as described in the Underwriters Laboratories, Inc. publication UL94-Tests for Flammability of Plastics Materials. Specimens were injection molded test bars 1/16 inch (1.6 mm) thick. In accordance with the procedure, they were conditioned for 48 hours at 50% RH. Directions provided in UL94 were used to judge if a material passed this part of the test to be rated V-0.

EXPERIMENTS

Series 1—Controls

A search for additives to improve elongation without increasing flammability was carried out. Table 1 lists a selected group of the additives tried. Some improved elongation but gave a poor V-2 rather than a good V-0 UL94 flammability rating, while others had no effect on elongation.

SERIES 1 TABLE

| Control | Nylon 66 % | Brominated Polystyrene % | Antimony Oxide Concentrate % | Additive Name | % | Tensile Strength psi | MPa | Elongation % | UL94 Rating |
|---|---|---|---|---|---|---|---|---|---|
| A | 69.5 | 23 | 7.5 | None | 0 | 10,300 | 71 | 7 | V-0 |
| B | 70.5 | 23 | 5 | Polyethylene glycol Carbowax 4000 | 1.5 | 8,900 | 61 | 20 | V-2 |
| C | 70.5 | 23 | 5 | Esters of unsaturated fatty acid "Loxiol"G73 | 1.5 | 10,100 | 70 | 17 | V-2 |
| D | 70.5 | 23 | 5 | Dioctyl Adipate | 1.5 | 11,300 | 78 | 7.8 | V-2 |
| E | 70.5 | 23 | 5 | Dioctyl Terephthalate | 1.5 | 11,600 | 80 | 6.8 | V-2 |
| F | 70.5 | 23 | 5 | Dioctyl Azelate | 1.5 | 11,100 | 76 | 7.7 | V-2 |
| G | 69 | 25 | 6 | None | 0 | 11,200 | 77 | 3.4 | V-0 |
| H | 68 | 25 | 6 | Stearyl Erucamide | 1 | 10,400 | 72 | 4.4 | V-0 |
| I | 68 | 25 | 6 | Stearyl Alcohol | 1 | 10,600 | 73 | 4.6 | V-2 |

It is seen that either elongation is not increased substantially i.e., by more than 15%, or that flame retardancy is poor (i.e., V-2). In Controls C–F the additives are commonly known plasticizers, and in Controls H and I, they are mold release agents.

Series 2 Experiments

Use of nonionic surfactants is summarized in the following Series 2 table.

The Series 2 Table shows that compositions of the invention improve elongation and have a V-0 flammability rating.

SERIES 2 TABLE

| Example (Number) Control (Letter) | Nylon 66 Wt % | Brominated Polystyrene Wt % | Antimony Oxide Concentrate Wt % | Surfactant Type | Wt % | n | m | R | Tensile Strength psi | MPa | Elongation % | UL94 Rating | Comments |
|---|---|---|---|---|---|---|---|---|---|---|---|---|---|
| A | 67 | 25 | 6 | I | 2 | 9-10 | — | — | 9,100 | 63 | 9 | V-0 | n value too low low elongation |
| 1 | 67 | 25 | 6 | I | 2 | 12-13 | — | — | 8,700 | 60 | 20 | V-0 | |
| 2 | 68 | 25 | 6 | I | 1 | 12-13 | — | — | 7,200 | 50 | 35 | V-0 | |
| 3A | 67.5 | 25 | 6 | I | 1.5 | 12-13 | — | — | 8,700 | 60 | 11 | V-0 | anomolous result |
| 3B | 67.5 | 25 | 6 | I | 1.5 | 12-13 | — | — | 8,700 | 60 | 17 | V-0 | |
| 4 | 67 | 25 | 6 | I | 2 | 12-13 | — | — | 8,500 | 59 | 23 | V-0 | |
| B | 69 | 25 | 6 | NONE | | | — | — | 10,400 | 72 | 3.5 | V-0 | low elongation |
| 5 | 67 | 25 | 6 | I | 2 | 16 | — | — | 8,000 | 55 | 20 | V-0 | |
| 6 | 67 | 25 | 6 | II | 2 | — | 8 | $C_9H_{19}$ | 9,000 | 66 | 32 | V-0 | |
| C | 67 | 25 | 6 | I | 2 | 1 | — | — | 10,800 | 74 | 3.4 | V-0 | n value is too low |
| D | 67 | 25 | 6 | I | 2 | 3 | — | — | 10,700 | 74 | 4.1 | V-0 | |
| E | 67 | 25 | 6 | I | 2 | 5 | — | — | 10,800 | 74 | 4.7 | V-0 | elongation is low |
| F | 67 | 25 | 6 | I | 2 | 7-8 | — | — | 10,300 | 71 | 5.2 | V-0 | |
| G | 67 | 25 | 6 | I | 2 | 9-10 | — | — | 10,200 | 70 | 6.4 | V-0 | |
| 7 | 67 | 25 | 6 | I | 2 | 12-13 | — | — | 9,700 | 69 | 33 | V-0 | |
| 8A | 67 | 25 | 6 | I | 2 | 40 | — | — | 8,400 | 58 | 28 | V-2 | anomolous result |
| 8B | 67 | 25 | 6 | I | 2 | 40 | — | — | 7,300 | 50 | 21 | V-0 | |
| H | 67 | 25 | 6 | II | 2 | — | 5 | H | 10,500 | 72 | 5.8 | V-0 | m too low |
| 9 | 67 | 25 | 6 | II | 2 | — | 9-10 | H | 10,100 | 70 | 23 | V-0 | |
| I | 67 | 25 | 6 | II | 2 | — | 12-13 | H | 8,500 | 59 | 25 | V-2 | amonolous result |
| 10 | 67 | 25 | 6 | III | 2 | — | 10 | H | 9,600 | 69 | 36 | V-0 | |

Series 3 Experiments

This series establishes that the minimum amount of brominated polystyrene should be present is over 22%; that the lower limit of the antimony trioxide present should be about 5%; and that the surfactant should not be present in amounts more than about 3%. The data is presented as follows:

SERIES 3 TABLE

| Example (No.) Comparison (Letter) | Nylon 66 % | Brominated Polystyrene % | Antimony Oxide Concentrate % | Surfactant Type | m | R | % | Tensile Strength psi | MPa | Elongation % | UL94 Rating |
|---|---|---|---|---|---|---|---|---|---|---|---|
| 1 | 67 | 25 | 6 | II | 15 | H | 2% | 8500 | 59 | 35 | V0 |
| A | 70 | 22 | 6 | II | 15 | H | 2% | 8300 | 57 | 38 | V2 |
| 2 | 68.5 | 23.5 | 6 | II | 15 | H | 2% | 8100 | 56 | 34 | V0 |
| 3 | 67 | 25 | 6 | II | 15 | H | 2% | 8100 | 56 | 33 | V0 |
| B | 72 | 22 | 4 | II | 15 | H | 2% | 9400 | 65 | 41 | V2 |
| C | 70.5 | 23.5 | 4 | II | 15 | H | 2% | 9400 | 65 | 41 | V2 |
| D | 69 | 25 | 4 | II | 15 | H | 2% | 8600 | 59 | 38 | V2 |
| E | 71 | 22 | 5 | II | 15 | H | 2% | 8800 | 61 | 36 | V2 |
| F | 69.5 | 23.5 | 5 | II | 15 | H | 2% | 8600 | 59 | 34 | V2 |
| G | 68 | 25 | 5 | II | 15 | H | 2% | 8700 | 60 | 34 | V2 |
| 4 | 68 | 25 | 6 | II | 15 | H | 1% | 8600 | 59 | 13 | V0 |
| 5 | 67.5 | 25 | 6 | II | 15 | H | 1.5% | 8800 | 61 | 17 | V0 |
| 6 | 67 | 25 | 6 | II | 15 | H | 2% | 8500 | 59 | 32 | V0 |
| 7 | 66 | 25 | 6 | II | 15 | H | 3% | 7500 | 52 | 48 | V0 |
| H | 65 | 25 | 6 | II | 15 | H | 4% | 7300 | 50 | 40 | V2 |

Comparison A when compared with Example 2 shows that the amount of brominated polystyrene should be over 22% by weight. Comparisons B-G when compared with Example 3 shows that the amount of antimony oxide present should be over 5% by weight. Comparison H when compared with Examples 4-7 shows that the amount of surfactant present should be less than 4%.

Series 4 Experiments

This series demonstrates use of other polyamides in place of nylon 66.

SERIES 4 TABLE

| Example (no.) Control (letter) | Composition[1] Nylon Base Resin | Tensile Strength psi | MPa | Elongation % | UL94 Rating |
|---|---|---|---|---|---|
| A | Nylon 6 | 7000 | 48 | 24 | V2 |
| 1 | (90/10 Nylon 66/6) copolymer | 7600 | 52 | 32 | V1 V0 |
| 2 | Nylon 6/Nylon 66 Blend | 7700 | 53 | 61 | V0 |

SERIES 4 TABLE-continued

| Example (no.) Control (letter) | Composition[1] Nylon Base Resin | Tensile Strength psi | MPa | Elongation % | UL94 Rating |
|---|---|---|---|---|---|
| 3 | (Nylon 66) | 8400 | 58 | 41 | V0 |

[1]All samples contained 67% nylon base resin, 25% brominated polystyrene, 6% antimony oxide concentrate, 0.05% cuprous iodide, and 2% surfactant of Type II wherein m is 15.

I claim:

1. A reinforced, flame-retardant composition consisting of
   (a) about 37-80 weight percent of composition of a polyamide of film-forming molecular weight selected from nylon 66 or nylon 66/6 copolymer;
   (b) about 22-34 weight percent of composition of a brominated polystyrene having an average molecular weight of at least about 30,000 and containing about 55-70% bromine by weight;
   (c) about 5-10 weight percent antimony oxide;
   (d) about 1-3 weight percent of composition of a non-ionic surfactant using the formula

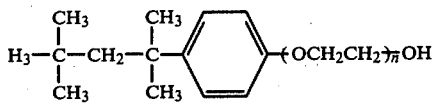

wherein n is a cardinal number of from 10-40, or

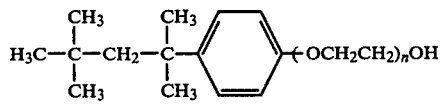

wherein m is a cardinal number of from 8-15 and R' is alkyl of 9-12 carbon atoms, and R is $C_9H_{19}$— or H—
the percent amounts of components (a) through (d) totaling 100%.

2. The composition of claim 1 wherein the polyamide is nylon 66.

3. The composition of claims 1 or 2 wherein the surfactant is

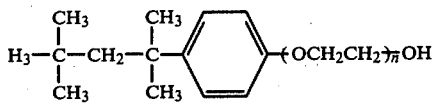

4. The composition of claim 1 or 2 wherein the surfactant is

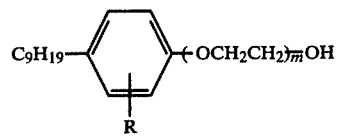

5. The composition of claim 3 wherein n is 12 or 13.
6. The composition of claim 4 wherein m is 15.

* * * * *